United States Patent [19]

Abe

[11] Patent Number: 5,854,885
[45] Date of Patent: Dec. 29, 1998

[54] TERMINAL APPARATUS

[75] Inventor: Koichi Abe, Yokohama, Japan

[73] Assignee: Canon Kabushiki Kaisha, Tokyo, Japan

[21] Appl. No.: 677,395

[22] Filed: Jul. 9, 1996

[30] Foreign Application Priority Data

Jul. 19, 1995 [JP] Japan .................................. 7-205233

[51] Int. Cl.⁶ .............................. B41B 15/00; H04N 1/00
[52] U.S. Cl. ......................... 395/113; 358/437; 358/442
[58] Field of Search ................................... 358/468, 442, 358/401, 400, 437; 395/103, 108, 111, 109, 113, 399, 400; 235/54 F; 347/7

[56] References Cited

U.S. PATENT DOCUMENTS

| | | | |
|---|---|---|---|
| 4,025,757 | 5/1977 | McKay et al. | 235/54 F |
| 5,016,183 | 5/1991 | Korsh | 360/69 |
| 5,610,635 | 3/1997 | Murray | 347/7 |

*Primary Examiner*—Thomas D. Lee
*Assistant Examiner*—Jerome Grant II
*Attorney, Agent, or Firm*—Fitzpatrick, Cella, Harper & Scinto

[57] ABSTRACT

In a circuit formed with a resistor 32, connection terminals 28 and 23, a resistor 25, and connection terminals 24 and 29 all of which are shown in FIG. 3, when a one-chip microcomputer 21 shown in FIG. 1 inputs a high-level SCAN signal, a high- or low-level SENSE signal is generated according to the mounting state of an ink cartridge 33. When the ink cartridge 33 is mounted, a low-level SENSE signal is generated in response to a high-level SCAN signal. When the ink cartridge 33 is not mounted, a high-level SENSE signal is generated in response to a high-level SCAN signal. The one-chip microcomputer 21 monitors the mounting state of the ink cartridge 33 by detecting the level of a SENSE signal in order to prevent unnecessary initialization operations for the head of the ink cartridge so as not to reduce the number of sheets available for recording and not to increase running costs.

24 Claims, 8 Drawing Sheets

TERMINAL APPARATUS

BACKGROUND OF THE INVENTION

1. Field of the Invention

The present invention relates to a terminal apparatus, such as a facsimile apparatus, which has a power backup function for supplying power from an auxiliary power unit to storage means for holding image data and other data when the power supply from the main power unit is interrupted due to power failure or the like, and also has a recording function with recording means such as an ink-jet recorder.

2. Description of the Related Art

In a conventional terminal apparatus, such as a facsimile apparatus, received image data is temporarily stored in memory, and then recorded on or output to a recording sheet. When all recording sheets have been used up, memory receiving is performed instead, that is, received image data is stored in the memory.

If AC power is interrupted (such as during a power failure), received image data stored in memory may be lost. To prevent this problem from occurring, the AC input power is backed up by a secondary battery or the like when the input power has been cut.

In a terminal apparatus which uses an ink-jet recording unit as recording means, in order to prevent the head from clogging, a head recovery operation for taking in and discharging ink into and from the head is performed as an ink-cartridge initialization operation every time the ink cartridge is replaced. When the power is turned on (when the apparatus is installed), the head recovery operation is always performed since the previous state of the ink cartridge is not clear. When the head recovery operation is not performed for a new, mounted ink cartridge, the head may clog and recording failure may occur. Therefore, the head recovery operation is always performed when the power is turned on (when the apparatus is installed).

In a terminal apparatus which has a power backup function for the memory and uses recording means to which an ink cartridge is mounted, a head recovery operation is always performed when AC input power is recovered.

Since the head recovery operation is always performed when AC input power is recovered, in a terminal apparatus which has a power backup function for memory and uses recording means to which an ink cartridge is mounted, when the ink cartridge is not replaced during AC input power cut, the head recovery operation performed in order to prevent the head from clogging after an AC input power is recovered is not needed. When the head recovery operation is always performed after recovery of AC input power, an unnecessary operation may be performed. Therefore, extra ink is used due to ink taking-in and discharging during an unnecessary head recovery operation, and the number of sheets available for recording is reduced. Especially when the above apparatus is used in a condition in which the AC input power is frequently interrupted instantaneously, the number of unnecessary head recovery operations increases and the number of sheets available for recording is substantially reduced, thereby increasing running costs.

As described above, in a terminal apparatus having recording means to which a cartridge such as an ink cartridge is detachably mounted, since an initialization operation for the cartridge, such as the head recovery operation for an ink cartridge, is performed when the AC input power recovers from a power failure or the like, even when the initialization operation for the cartridge is not required in such a case as when the cartridge is not replaced during AC input power interruption, the initialization operation for the cartridge is performed, reducing the recording capacity and increasing running costs due to the unnecessary initialization operations.

SUMMARY OF THE INVENTION

Accordingly, it is an object of the present invention to improve an apparatus having an ink cartridge.

Another object is to provide a terminal apparatus which prevents the possible recording capacity from decreasing and running cost from increasing both caused by unnecessary initialization operations for a cartridge.

The foregoing objects are achieved according to one aspect of the present invention through the provision of a terminal apparatus having a main power unit for supplying power to each section of the apparatus, an auxiliary power unit, storage means for holding information with the use of supplied power, recording means provided with a detachable cartridge, a central control means for controlling the whole apparatus according to the operating state, and power-supply control means for controlling such that the main power unit supplies power to the storage means in a normal operating state in which the main power unit operates and the auxiliary power unit supplies power to the storage means in a case when the main power unit stops its operation, wherein monitoring means are provided for monitoring the mounting state of the cartridge in a backup state in which the main power unit stops its operation and the auxiliary power unit supplies power to the storage means.

DETAILED DESCRIPTION OF THE PREFERRED EMBODIMENT

Figure 1:
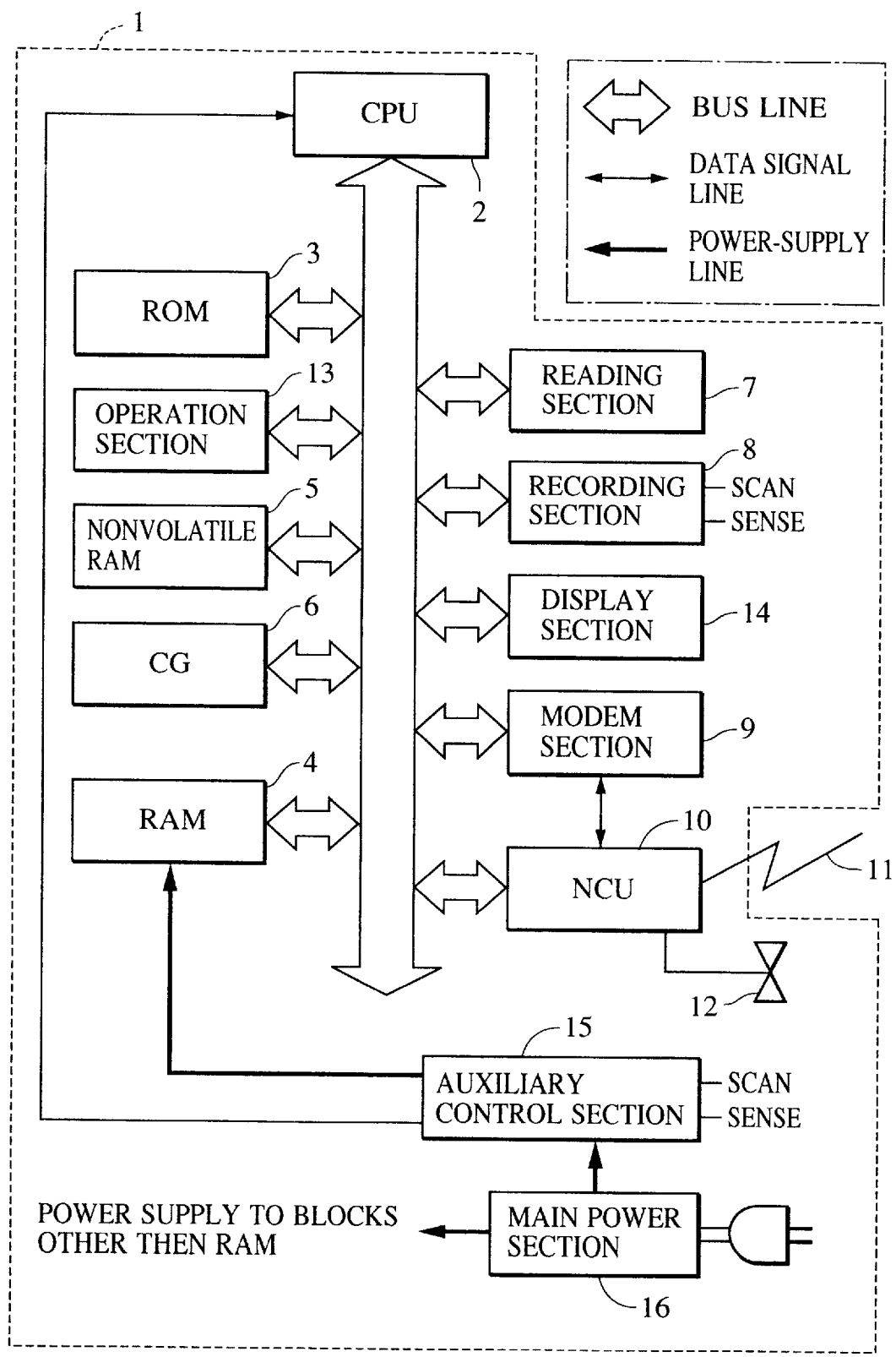
FIG. 1 is a block diagram showing a configuration of a facsimile apparatus, a terminal apparatus according to an embodiment of the present invention.

An embodiment of the present invention will be described below in detail by referring to the drawings.

FIG. 1 is a block diagram showing a configuration of a facsimile apparatus, a terminal apparatus according to an embodiment of the present invention.

A facsimile apparatus 1 is provided with a CPU 2 which includes a microprocessor, as shown in FIG. 1. The CPU 2 controls RAM 4, nonvolatile RAM 5, a character generator (CG) 6, a reading section 7, a recording section 8, a modem section 9, a network control unit (NCU) 10, an operation section 13, and a display section 14, according to programs stored in ROM 3.

The RAM 4 is used as a working area of the CPU 2, and also serves as storage for two-valued image data read by the reading section 7, two-valued image data recorded in the recording section 8, two-valued image data which is modulated by the modem section 9 and output to a telephone line 11 through the NCU 10, and two-valued image data obtained by demodulating by the modem section 9 the analog signal input from the telephone line 11 through the NCU 10. As will be described later, power is supplied from a main power unit 16 to the RAM 4 in a normal operating state, in which the main power unit operates. When the operation of the main power unit 16 is stopped, a secondary battery 19 (shown in FIG. 2) supplies power to the RAM 4 in a power backup function. This power supply to the RAM 4 is controlled by an auxiliary control section 15.

In the nonvolatile RAM 5, data necessary for operating the apparats and data registered by the user, such as shortened phone numbers, are stored. These items of data are held, are not volatile, even when power to the apparatus is intercepted.

The CG 6 includes ROM for storing character data such as JIS codes and ASCII codes. Character data is taken out in units of two bytes, as required.

The reading section 7 has a DMA controller, an image-processing IC chip, an image sensor, and a CMOS logic IC chip. The reading section 7 converts image data read by a contact sensor (CS) to the corresponding two-valued image data and transfers the data to the RAM 4 sequentially.

The recording section 8, which includes a DMA controller, an ink-jet recording unit, and a CMOS logic IC chip, outputs image data stored in the RAM 4 as a hard copy. The ink-jet recording unit has a detachable head-integrated ink cartridge 33 (shown in FIG. 3).

The modem section 9 has a G3 modem, a G2 modem, and a clock generation circuit connected to these modems. The modem section 9 modulates transmission image data stored in the RAM 4 and outputs it through the NCU 10 to the telephone line 11. The modem section 9 also demodulates a signal input from the telephone line 11 through the NCU 10 and stores the demodulated signal into the RAM 4 as two-valued image data. The modulation and demodulation operations in the modem section 9 are controlled by the CPU 2.

The NCU 10 has a control unit for selectively switching the connection to the telephone line 11 between the modem section 9 and a telephone set 12.

The telephone set 12 is mounted to the apparatus integrally. The telephone set 12 includes a handset, a speech network, a dialer, a ringer, a ten-key pad, and a single-stroke key, and is connected to the NCU 10.

The operation section 13 has a start key for directing the start of image transmission, image reception, or the like, a mode selection key for specifying an operation mode in receiving and transmission, such as fine, standard, and automatic receiving modes, a ten-key pad for dialing, and a single-stroke key. When one of these keys is pressed, the corresponding ON signal is sent to the auxiliary control section 15.

The display section 14 includes LEDs and a LCD module in which a seven-segment display for time indication, an icon LCD for displaying various modes, and a dot-matrix LCD for displaying one line by 16 columns, each of the columns having 5 by 7 dots, are combined. In the LCD module, the icon LCD and the dot-matrix LCD are independent to each other.

The auxiliary control section 15 has a one-chip microcomputer 21, described later, and a capacitor-type secondary battery 19, and can operate with power only supplied from the secondary battery 19. The auxiliary control section 15 controls power supply to the RAM 4, described above, while monitoring the power supply state from the main power unit 16. The auxiliary control section 15 also has detection means for detecting the state in which the ink cartridge 33 is mounted to the recording section 8. The auxiliary control section 15 will be described later in detail. The main power unit 16 includes a switching power unit with AC input and DC output.

Figure 2:
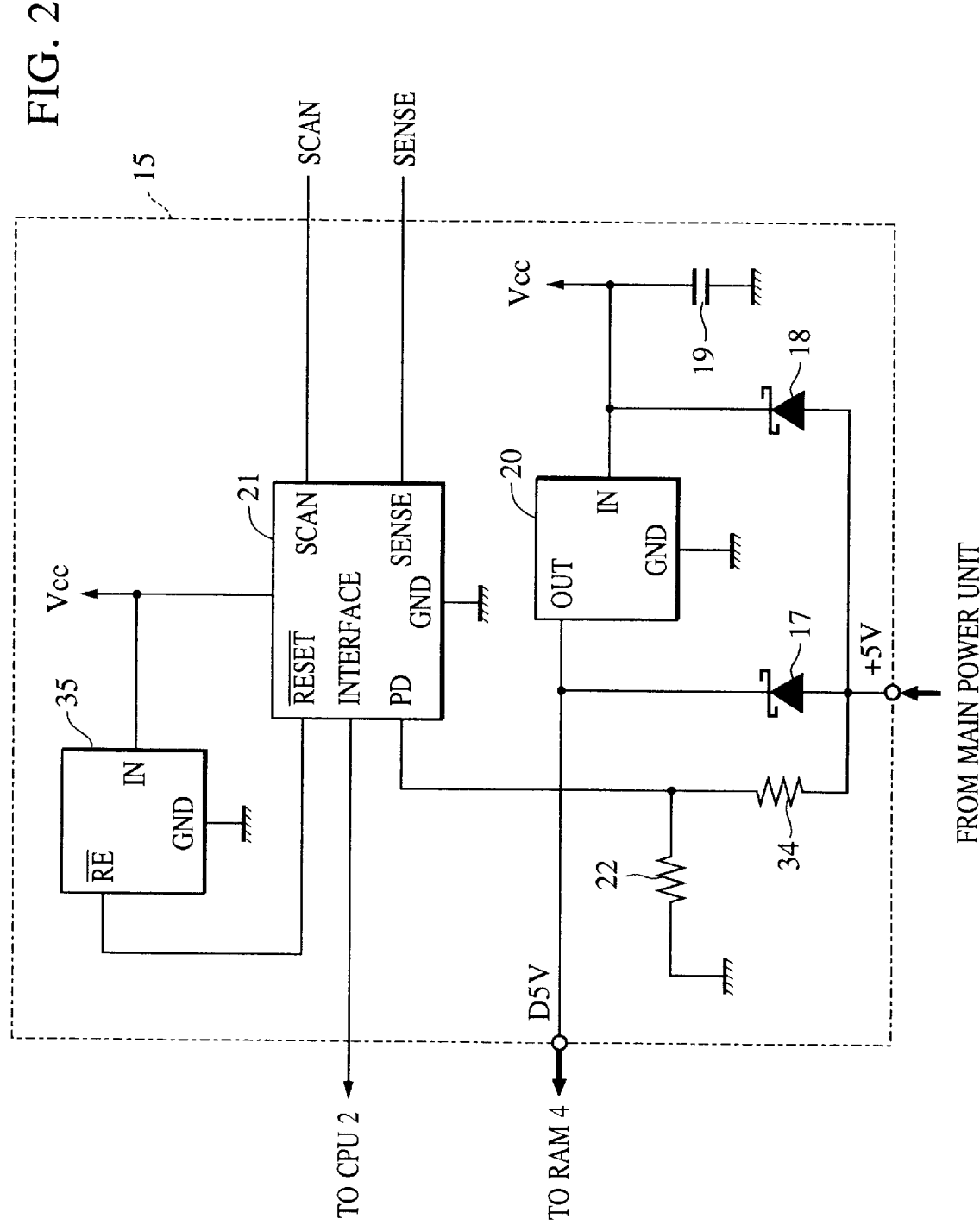
FIG. 2 is an outlined circuit diagram showing a configuration of an auxiliary control section of the facsimile apparatus shown in FIG. 1.

The configuration of the auxiliary control section 15 will be described below by referring to FIG. 2. FIG. 2 is an outlined circuit diagram showing the configuration of the auxiliary control section 15 in the facsimile apparatus shown in FIG. 1.

As shown in FIG. 2, the auxiliary control section 15 has a one-chip, eight-bit microcomputer 21 which can operate with only a few power consumption. This one-chip microcomputer 21 includes a timer. The one-chip microcomputer 21 is connected to the recording section 8 so as to enable communication and it can also perform data transfer with the CPU 2 through a serial interface. This one-chip microcomputer 21 outputs a SCAN signal to the recording section 8 from a SCAN port and reads a SENSE signal from the recording section 8 into SENSE_BUF. With transfer of these SCAN and SENSE signals, the mounting state of the ink cartridge 33 in the recording section 8 can be monitored.

When the main power unit 16 supplies an output power of +5V, in other words, in a normal operation, this output power of +5V is divided by resistors 22 and 34 and directly supplied to a PD port of the one-chip microcomputer 21, and the output power of +5V is also supplied to the RAM 4 through a reverse-current-prevention Schottky barrier diode 17. Simultaneously with these power supplies, the main power unit 16 charges the secondary battery 19 with its output voltage of +5V.

When the supply of an output power of +5V from the main power unit 16 is interrupted due to power failure or the like, the secondary battery 19 supplies a power of +5V to the one-chip microcomputer 21 and also supplies a power of +5V to the RAM 4 through a step-up DC-DC converter 20.

An output power of +5V is input from the main power unit 16 to an IN port of the DC-DC converter 20 through a reverse-current-prevention Schottky barrier diode 18. When the voltage input to the IN port is +5V or more, the DC-DC converter 20 outputs that input voltage from an OUT port as an output voltage. When the voltage input to the IN port of the DC-DC converter 20 is less than +5V, the input voltage is increased and a power of +5V is output from the OUT port.

The one-chip microcomputer 21 is reset by a signal from a reset circuit 35. An output signal from an output port RE of the reset circuit 35 is input to a reset terminal, RESET, of the one-chip microcomputer 21. When the output voltage of the secondary battery 19 is less than the minimum operation voltage of the one-chip microcomputer 21, the reset circuit 35 outputs a low-level signal from the output port RE to reset the one-chip microcomputer 21. In contrast, when the output voltage of the secondary battery 19 is equal to or more than the minimum operation voltage of the one-chip microcomputer 21, the reset circuit 25 outputs a high-level signal from the output port RE and the one-chip microcomputer 21 is released from a reset state.

Figure 3:
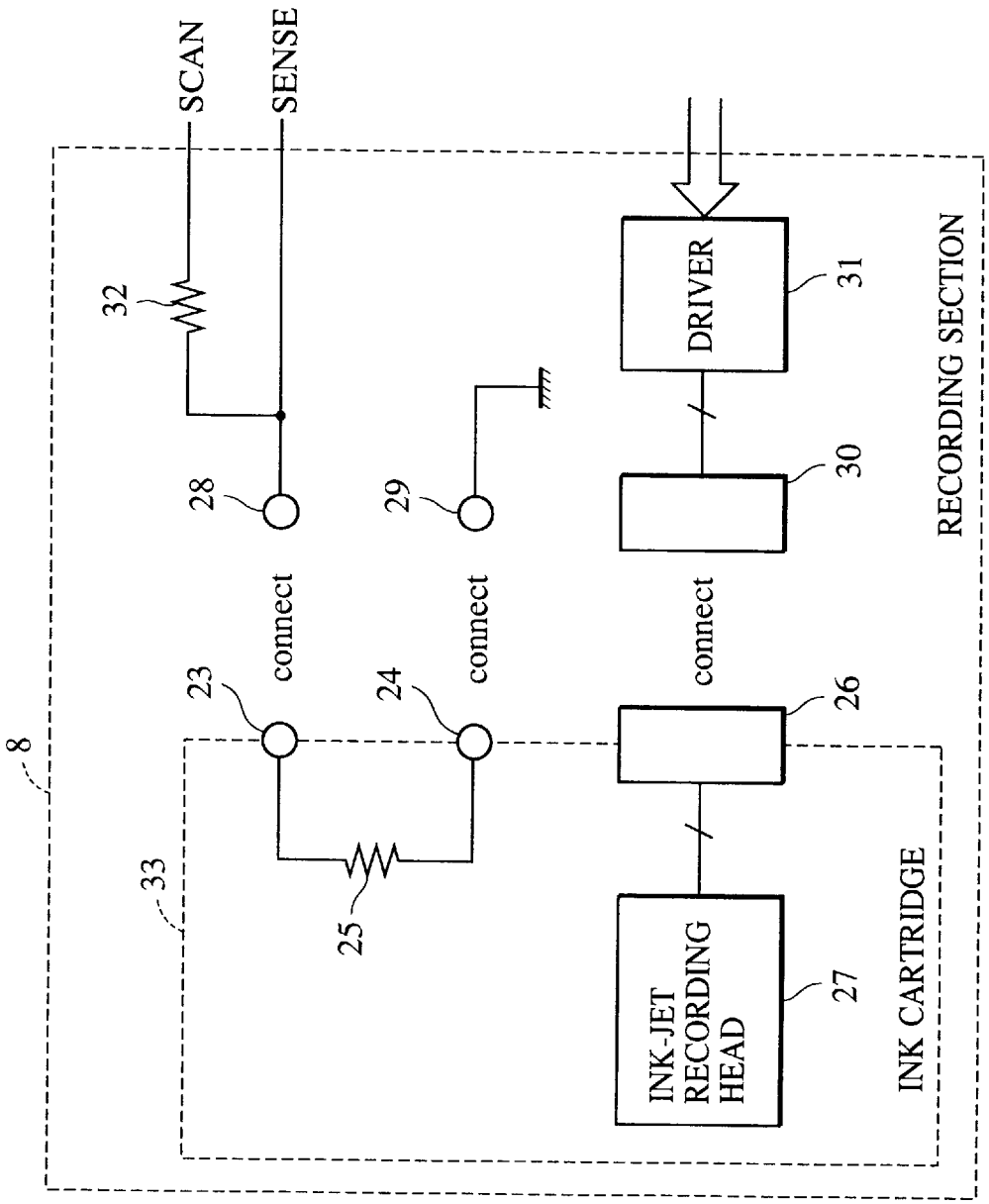
FIG. 3 is a block diagram showing a configuration of the main section in a recording section of the facsimile apparatus shown in FIG. 1.

The main part of the recording section 8 will be described below by referring to FIG. 3. FIG. 3 is a block diagram showing the main part of the recording section in the terminal apparatus shown in FIG. 1.

As shown in FIG. 3, the recording section 8 includes a driver 31 to which print data sent from the CPU 2 is input. The driver 31 is provided with a connection terminal 30. The connection terminal 30 is electrically and detachably connected to a connection terminal 26 of the ink cartridge 33.

The ink cartridge 33 is mounted to the recording section 8 detachably. The ink cartridge 33 has the connection terminal 26, described above, connection terminals 23 and 24 connected to each other through a resistor 25, and an ink-jet recording head 27. The connection terminal 26 is electrically connected to the ink-jet recording head 27. The ink-jet recording head 27 is driven by the driver 31 so as to record print data sent from the CPU 2 on a recording sheet and is controlled by the driver 31 so as to perform a head recovery operation at initialization in order to prevent the head from clogging with ink. The head recovery operation refers to an operation in which the head takes in and discharges ink.

The connection terminal 23 is connected to one end of the resistor 25, and in addition, is detachably connected to a connection terminal 28 provided outside the ink cartridge 33. The connection terminal 28 serves as an input terminal for reading a SCAN signal sent from the one-chip microcomputer 21 through a resistor 32 and also serves as an output terminal for sending a SENSE signal to the one-chip microcomputer 21. The resistor 32 is set such that its resistance is sufficiently larger than that of the resistor 25. The resistors 32 and 25 are provided as a current limiter and a voltage-level adjuster.

The connection terminal 24 is detachably connected to a connection terminal 29 provided outside the ink cartridge 33. The connection terminal 29 is connected to the ground.

The resistor 32, the connection terminals 28 and 23, the resistor 25, and the connection terminals 24 and 29 constitute a circuit for monitoring the mounting state of the ink cartridge 33.

In this circuit, when a high-level SCAN signal is input from the one-chip microcomputer 21, the level of a SENSE signal is determined according to the mounting state of the ink cartridge 33, and the SENSE signal is sent to the one-chip microcomputer 21. When the ink cartridge 33 is mounted, a low-level SENSE signal is generated in response to a high-level SCAN signal. When the ink cartridge 33 is not mounted, a high-level SENSE signal is generated in response to a high-level SCAN signal. Therefore, by detecting the level of a SENSE signal in the one-chip microcomputer 21, the mounting state of the ink cartridge 33 can be monitored.

Figure 4:
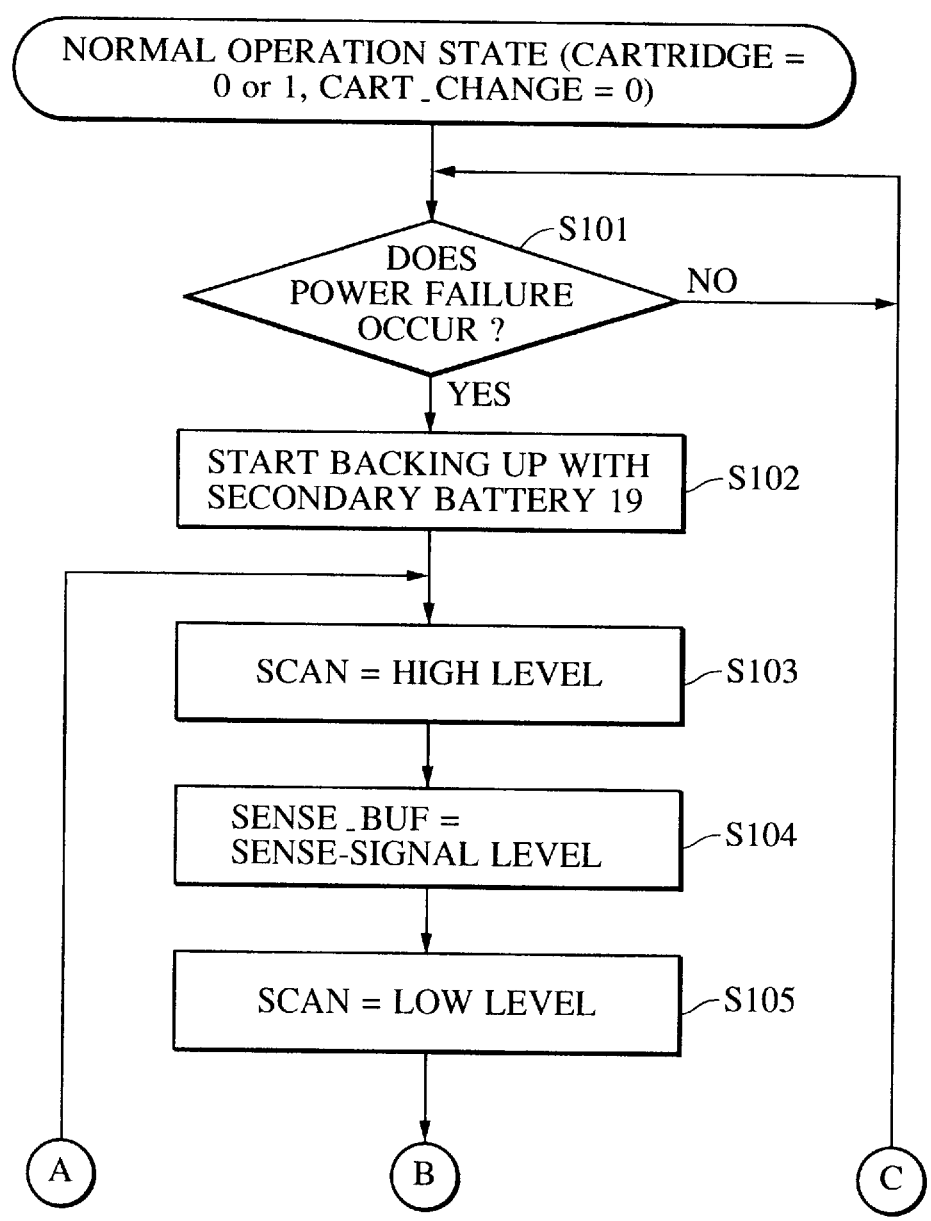
FIG. 4 is a flowchart showing a first half of a monitoring operation for an ink-cartridge mounting state in a condition in which the sub-control section of the facsimile apparatus shown in FIG. 1 backs up the system.
Figure 5:
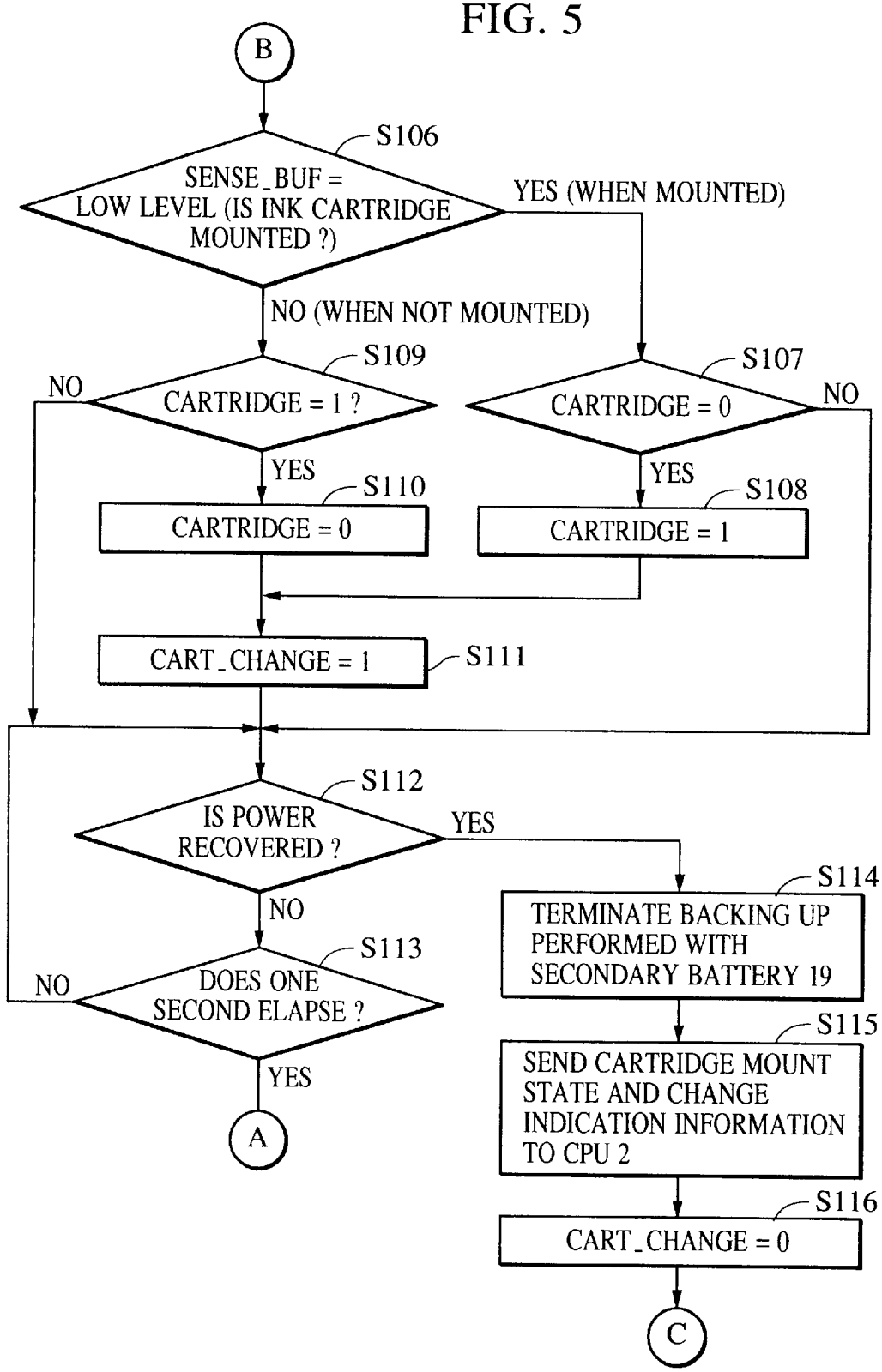
FIG. 5 is a flowchart showing a second half of the monitoring operation for an ink-cartridge mounting state in a condition in which the sub-control section of the facsimile apparatus shown in FIG. 1 backs up the system.
Figure 6:
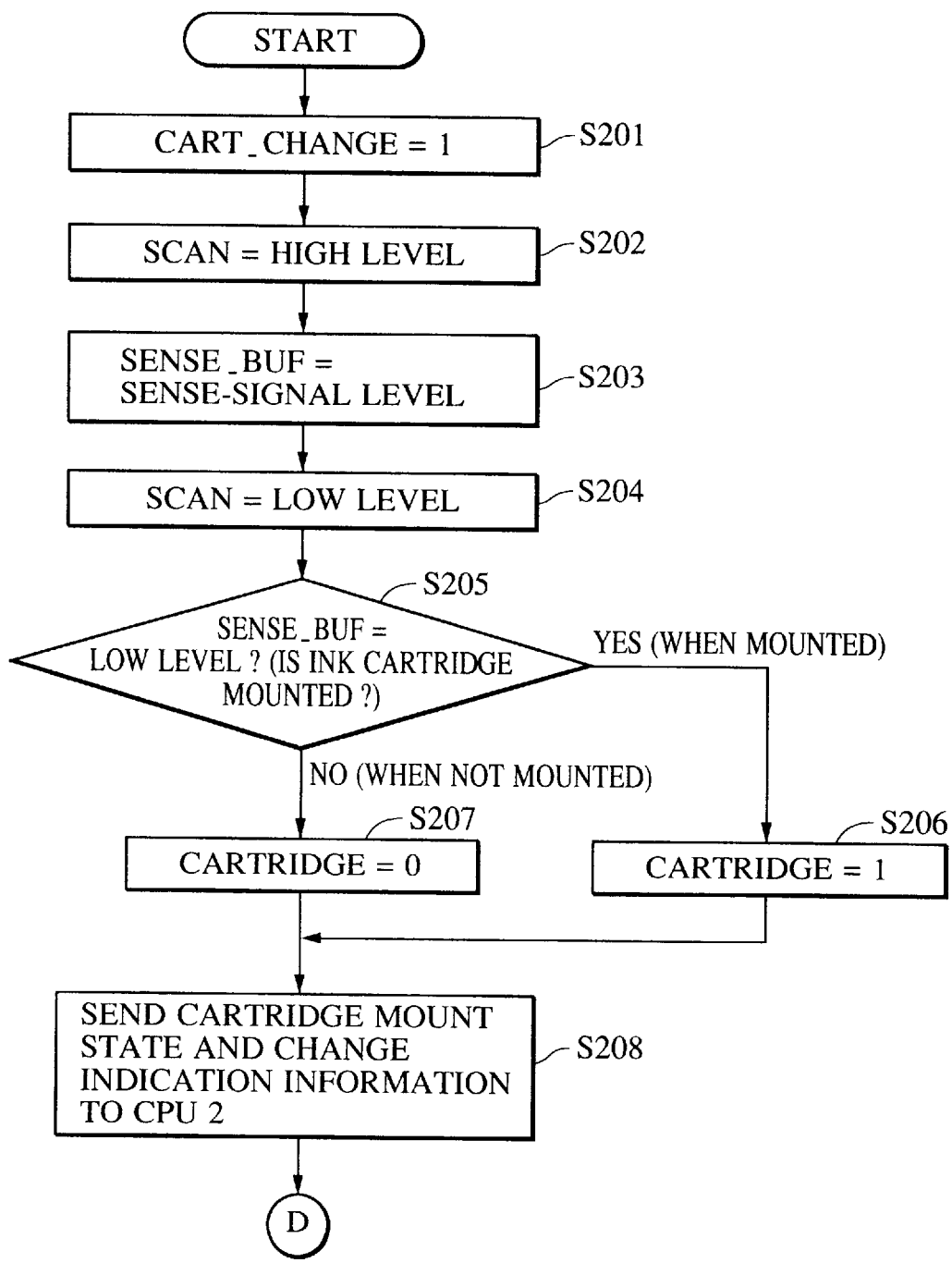
FIG. 6 is a flowchart showing a first half of a monitoring operation for an ink-cartridge mounting state in a normal operating state or in a condition in which a reset is released by the sub-control section of the facsimile apparatus shown in FIG. 1.
Figure 7:
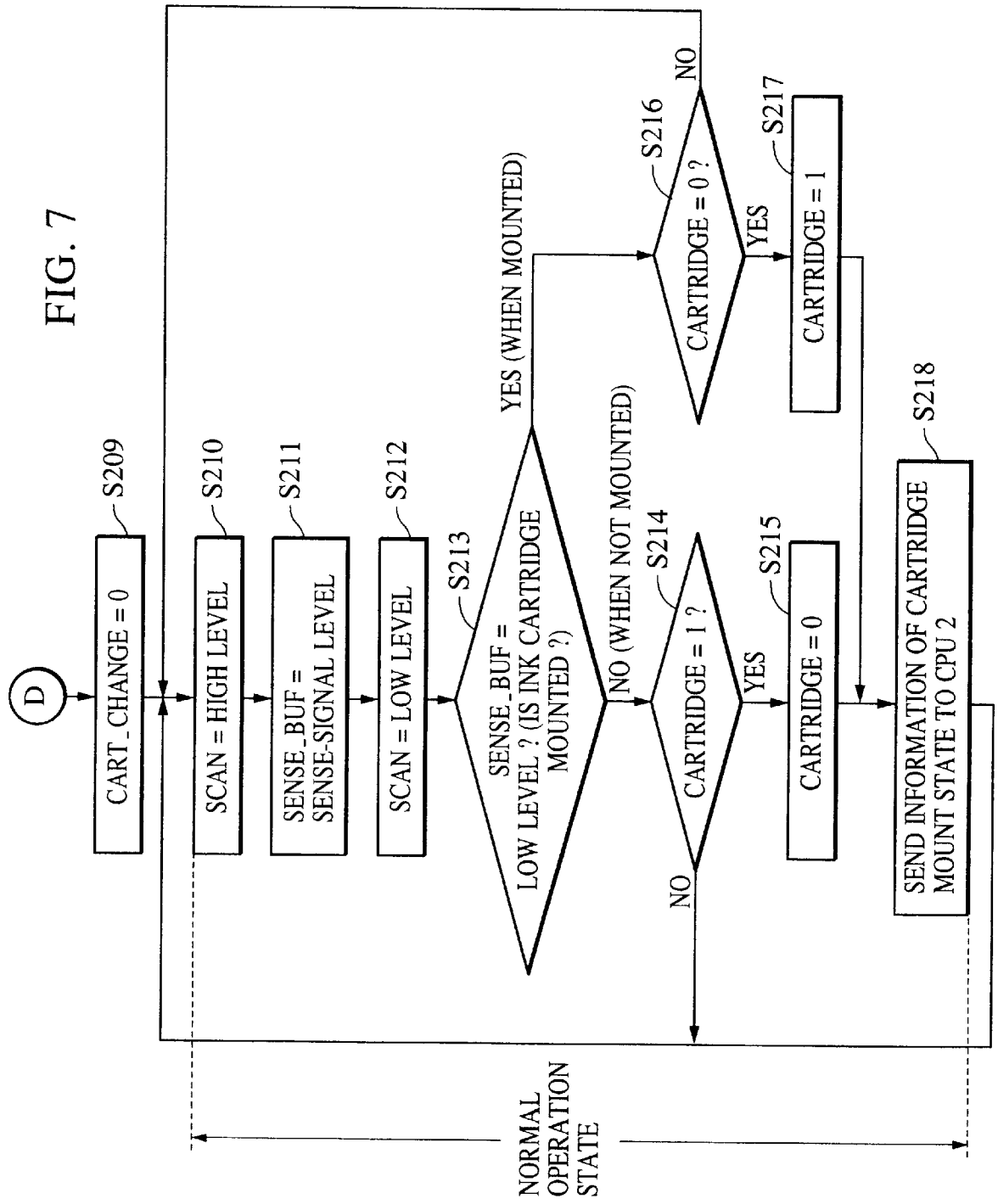
FIG. 7 is a flowchart showing a second half of the monitoring operation for an ink-cartridge mounting state in a normal operating state or in a condition in which a reset is released by the sub-control section of the facsimile apparatus shown in FIG. 1.

How the one-chip microcomputer 21 monitors the mounting state of the ink cartridge will be described below by referring to FIGS. 4 to 7. FIGS. 4 and 5 are a flowchart indicating the monitoring operation for the mounting state of the ink cartridge in a power backup state supported by the auxiliary control section 15 of the facsimile apparatus shown in FIG. 1. FIGS. 6 and 7 are a flowchart indicating the monitoring operation for the mounting state of the ink cartridge in a normal state or a state after a reset is released by the auxiliary control section 15 of the facsimile apparatus shown in FIG. 1.

How the one-chip microcomputer 21 monitors the mounting state of the ink cartridge in a power backup state will be first described below by referring to FIGS. 4 and 5.

In a normal operating state, the one-chip microcomputer 21 monitors the mounting state of the ink cartridge 33 by transmitting a SCAN signal and receiving a SENSE signal, as shown in FIG. 4. Monitoring results are indicated by flags.

A cartridge mounting state flag, CARTRIDGE, is used as a flag indicating information concerning the mounting state of the ink cartridge 33. When the ink cartridge 33 is mounted, this cartridge mounting state flag, CARTRIDGE, is set to 1. When the ink cartridge 33 is not mounted, the flag CARTRIDGE is set to 0. A cartridge change indication flag, CART_CHANGE, indicates whether the cartridge 33 was changed during a power backup state, in which the secondary battery 19 supplies power to the RAM 4 after AC input power failure occurs. When the cartridge 33 is changed during a power backup state, the cartridge change indication flag, CART_CHANGE, is set to 1. When the cartridge is not changed during a power backup state, the CART_CHANGE flag is set to 0. In a normal operating state, this flag is set to 0.

The information indicated by each flag is sent to the CPU 2 through the serial interface, as required.

When a power failure occurs during a normal operating state (step S101), the secondary battery 19 starts backing up for the RAM 4, that is, supplying power to the RAM 4 (step S102). As the backup operation starts, monitoring of the mounting state of the ink cartridge 33 starts.

When the monitoring starts, a high-level SCAN signal is sent through the SCAN port (step S103).

After the SCAN signal is transmitted, a SENSE signal is read into SENSE_BUF and the level of the SENSE signal is held in SENSE_BUF (step S104).

Then, a low-level SCAN signal is sent from the SCAN port and the monitoring is temporarily terminated (step S105). A SCAN signal is set to high while the mounting state of the ink cartridge 33 is monitored and the SCAN signal is set to low when the monitoring is terminated, eliminating continuous power consumption at the resistors 32 and 25, and also suppressing the rate at which the secondary battery 19 is exhausted. Therefore, the backup state for the RAM 4 can last for a long period of time.

After a low-level SCAN signal is sent, it is determined whether the level of the SENSE signal held in SENSE_BUF is low, as shown in FIG. 5 (step S106). With this determination, whether the ink cartridge 33 is mounted is decided.

When the level of the SENSE signal held in SENSE_BUF is low, in other words, when the ink cartridge 33 is mounted, it is determined whether the CARTRIDGE flag is set to 0 (step S107).

When the CARTRIDGE flag is 0, the flag is set to 1 (step S108) and the CART_CHANGE flag is set to 1 (step S111).

After the CART_CHANGE flag is set to 1, or when the CARTRIDGE flag is not set to 0 (step S107), it is repeatedly checked for one second whether power is recovered (steps S112 and S113).

When the power is not recovered within this determination period of one second, the processing goes back to step S103 again.

In contrast, when the power is recovered within the determination period of one second, the secondary battery stops baking up for the RAM 4 (step S114), and the information (indicated by the flags) concerning the mounting state and the change indication of the ink cartridge 33 is sent to the CPU 2 through the serial interface (step S115). Then, the CART_CHANGE flag is set to 0 (step S116) and the processing goes back to step S101 again. The state of the apparatus converts to a normal operating state.

When the level of the SENSE signal held in SENSE_BUF is not low, in other words, when the ink cartridge 33 is not mounted, it is determined whether the CARTRIDGE flag is set to 1 (step S109).

When the CARTRIDGE flag is 1, the flag is set to 0 (step S110). Then, the processing starting from step S111 described above is performed.

When the CARTRIDGE flag is not set to 1 (step S109), the processing starting from step S112 described above is performed.

Since the mounting state of the ink cartridge is monitored in a power backup state for the RAM 4 caused by power failure or the like, and the monitoring results, which are the information related to the mounting state and the change indication of the ink cartridge 33, are sent to the CPU 2, it is not required to always perform a head recovery operation for the ink-jet recording head 27 after power recovery. Only when it is determined from the information related to the mounting state and the change indication of the ink cartridge 33 that the ink cartridge 33 has been changed, a head recovery operation is performed for the ink-jet recording head 27. A head recovery operation is performed only a necessary number of times. Therefore, a decrease in the maximum number of sheets available for recording caused by unnecessary head recovery operations is prevented and an increase in running cost is also prevented.

In this embodiment, the mounting state of the ink cartridge 33 is monitored at an interval of one second. The time interval used in monitoring the mounting state of the ink cartridge 33 is not limited to this value and it can be set appropriately according to the specifications of the apparatus.

Next, how the one-chip microcomputer 21 monitors the mounting state of the ink cartridge in a normal operating state or when a reset is released will be described below by referring to FIGS. 6 and 7.

When the output voltage of the secondary battery 19 is lowered below the minimum operation voltage of the one-chip microcomputer 21, the reset circuit 35 outputs a low-level signal from the RE output port to reset the one-chip microcomputer 21.

After that, when the output voltage of the secondary battery 19 reaches the minimum operation voltage of the one-chip microcomputer 21, the reset circuit 35 outputs a high-level signal from the RE output port to release a reset condition of the one-chip microcomputer 21.

When a reset condition of the one-chip microcomputer 21 is released, the CART_CHANGE flag is set to 1 (step S201) as shown in FIG. 6. A high-level SCAN signal is sent from the SCAN port, and monitoring of the mounting state of the ink cartridge 33 starts (step S202).

After the SCAN signal is transmitted, a SENSE signal is read into SENSE_BUF and the level of the SENSE signal is held in SENSE_BUF (step S203).

Then, a low-level SCAN signal is sent from the SCAN port and the monitoring is temporarily terminated (step S204). A SCAN signal is set to high while the mounting state of the ink cartridge 33 is monitored and the SCAN signal is set to low when the monitoring is terminated, suppressing power consumption at the resistors 32 and 25.

After a low-level SCAN signal is sent, it is determined whether the level of the SENSE signal held in SENSE_BUF is low (step S205). With this determination, whether the ink cartridge 33 is mounted is decided.

When the level of the SENSE signal held in SENSE_BUF is low, in other words, when the ink cartridge 33 is mounted, the CARTRIDGE flag is set to 1 (step S206). In contrast, when the level of the SENSE signal held in SENSE_BUF is not low, in other words, when the ink cartridge 33 is not mounted, the CARTRIDGE flag is set to 0 (step S207).

The information (indicated by the flags) concerning the mounting state and the change indication of the ink cartridge 33 is sent to the CPU 2 through the serial interface (step S208).

After the information related to the mounting state and the change indication of the ink cartridge 33 is sent to the CPU 2, the CART_CHANGE flag is set to 0 (step S209) as shown in FIG. 7, and the state of the apparatus converts to a normal operating state.

When a normal operating state is recovered after reset as described above, since the CART_CHANGE flag is set to 1 beforehand in order to indicate that the ink cartridge has been changed by the information related to the change indication of the ink cartridge 33, the CPU 2 directs in recording a head recovery operation to the ink-jet recording head 27 of the ink cartridge 33 irrespective of whether the ink cartridge 33 mounted during a reset of the microcomputer 21 is a new cartridge or the original cartridge. Therefore, the ink-jet recording head 27 is prevented from clogging, and recording failure caused by the clogging of the ink-jet recording head 27 is prevented.

When the state of the apparatus changes to a normal operating state, a high-level SCAN signal is sent from the SCAN port and monitoring of the mounting state of the ink cartridge 33 starts (step S210).

After the SCAN signal is transmitted, a SENSE signal is read into SENSE_BUF and the level of the SENSE signal is held in SENSE_BUF (step S211).

Then, a low-level SCAN signal is sent from the SCAN port and the monitoring is temporarily terminated (step S212). A SCAN signal is set to high while the mounting state of the ink cartridge 33 is monitored and the SCAN signal is set to low when the monitoring is terminated, suppressing power consumption at the resistors 32 and 25.

After a low-level SCAN signal is sent, it is determined whether the level of the SENSE signal held in SENSE_BUF is low (step S213). With this determination, whether the ink cartridge 33 is mounted is decided.

When the level of the SENSE signal held in SENSE_BUF is low, in other words, when the ink cartridge 33 is mounted, it is determined whether the CARTRIDGE flag is set to 0 (step S216).

When the CARTRIDGE flag is 0, the flag is set to 1 (step S217) and the information related to the mounting state of the ink cartridge 33 (the information indicated by the CARTRIDGE flag) is sent to the CPU 2 through the serial interface (step S218). Then, the processing goes back to step S210 again.

When the CARTRIDGE flag is not set to 0 (step S216), the processing goes back to step S210 again.

In contrast, when the level of the SENSE signal held in SENSE_BUF is not low, in other words, when the ink cartridge 33 is not mounted (step S213), it is determined whether the CARTRIDGE flag is set to 1 (step S214). When the CARTRIDGE flag is 1, the flag is set to 0 (step S215). Then, step S218 is executed and the processing goes back to step S210 again. When the CARTRIDGE flag is not 1, the processing goes back to step S210 again.

As described above, in a normal operating state, when the mounting state of the ink cartridge 33 is changed, the information concerning the mounting state of the ink cartridge 33 is sent to the CPU 2. Therefore, serial communications are performed between the one-chip microcomputer 21 and the CPU 2 at a minimum level and the work load of the CPU 2 is reduced.

The work load of the CPU 2 can also be reduced by not sending the information concerning the change indication of the ink cartridge 33 to the CPU 2.

In a power backup operation, monitoring of the mounting state of the ink cartridge 33 is performed at an interval of one second in order to reduce the power consumption of the secondary battery 19 as much as possible. In a normal operating state, since the main power unit 16 supplies a power of +5V, the power of the secondary battery 19 is not used by always monitoring the mounting state of the ink cartridge 33. With this monitoring, erroneous detection can be prevented.

Figure 8:
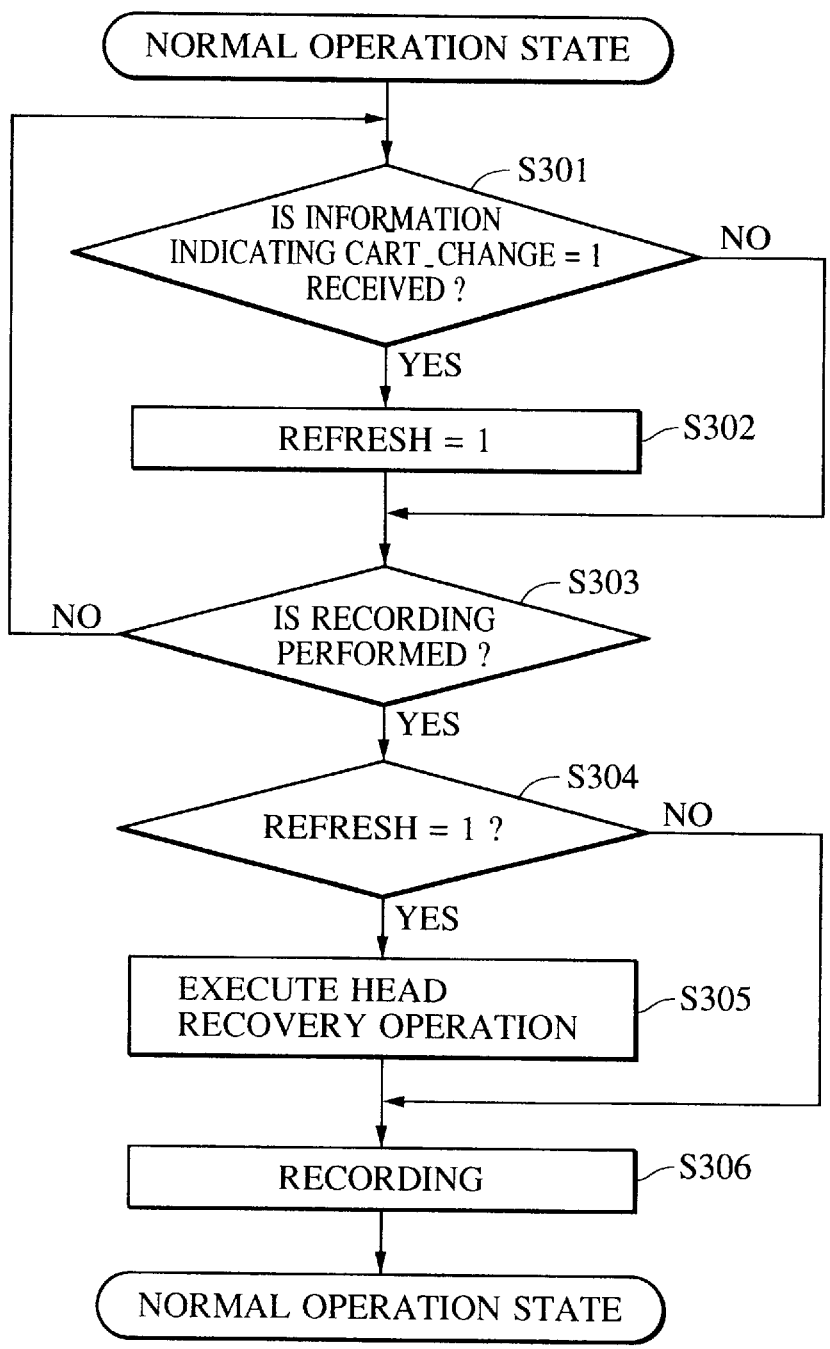
FIG. 8 is a flowchart showing a head recovery operation performed by the CPU of the facsimile apparatus shown in FIG. 1.

A head recovery operation directed by the CPU 2 in recording will be next described by referring to FIG. 8. FIG. 8 is a flowchart indicating a head recovery operation specified by the CPU 2 in recording in the facsimile apparatus shown in FIG. 1.

As shown in FIG. 8, when the CPU 2 receives the information of a CART_CHANGE flag indicating 1 from the one-chip microcomputer 21 (step S301), a REFRESH flag is set to 1 (step S302). The REFRESH flag is set to 0 in initialization.

It is determined whether a recording-execution direction is specified (step S303). When the direction is not specified, the processing goes back to step S301 again.

When the direction is specified, it is determined whether the REFRESH flag is 1 (step S304).

When the REFRESH flag is 1, a direction is specified to the recording section 8 so as to execute a head recovery operation. A head recovery operation is performed at the ink-jet recording head 27 (step S305).

After the ink-jet recording head 27 executes a head recovery operation, recording is performed (step S306). After recording, the state of the apparatus returns to a normal operating state.

In this embodiment, the one-chip microcomputer 21 monitors the mounting state of the ink cartridge 33. Other monitoring means, such as a sensor, may be used.

In this embodiment, the facsimile apparatus is taken as an example. It is needless to say that the principle of the present invention can be applied to other terminal apparatuses, such as an ink-jet printer.

What is claimed is:

1. A terminal apparatus having at least one section, comprising:
a main power unit for supplying power to the at least one section of said apparatus;
an auxiliary power unit for supplying power to the at least one section of said apparatus;
storage means for storing information with the use of power supplied by at least one of said main power unit and said auxiliary power unit;
recording means provided with a detachable cartridge;
power supply control means for controlling said main power unit to supply power to said storage means in a normal operating state in which said main power unit operates, and for controlling said auxiliary power unit to supply power to said storage means in a backup operating state when said main power unit stops its operation;
monitoring means for monitoring a mounting state of the cartridge in the backup operating state in which said main power unit stops operating and said auxiliary power unit supplies power to said storage means, thereby generating information concerning the mounting state of the cartridge and whether the cartridge is changed; and
central control means for receiving the information concerning the mounting state of the cartridge and whether the cartridge is changed and for controlling said recording means in accordance with the received information and an operating state, wherein said central control means receives said information concerning the mounting state of the cartridge and whether the cartridge is changed after the backup operating state is terminated.

2. A terminal apparatus according to claim 1, wherein said auxiliary power unit comprises a secondary battery.

3. A terminal apparatus according to claim 2, wherein said secondary battery is charged with power supplied from said main power unit in said normal operating state.

4. A terminal apparatus according to claim 1, wherein said recording means comprises an ink-jet recording unit.

5. A terminal apparatus according to claim 4, wherein said cartridge comprises a head-integrated ink cartridge.

6. A terminal apparatus according to claim 1, wherein said monitoring means operates with power supplied from said auxiliary power unit being used as the drive power during said backup state.

7. A terminal apparatus according to claim 1, wherein, during said normal operating state, said monitoring means outputs the information concerning the mounting state of said cartridge at said normal operating state to said central control means.

8. A terminal apparatus according to claim 1, wherein said monitoring means is set such that whether said cartridge has been changed is always monitored during said normal operating state in addition to monitoring whether said cartridge has been changed in said backup state.

9. A terminal apparatus having at least one section, comprising:
a main power unit for supplying power to the at least one section of said apparatus;
an auxiliary power unit for supplying power to the at least one section of said apparatus;
storage means for storing information with the use of power supplied by at least one of said main power unit and said auxiliary power unit;
recording means provided with a detachable cartridge;
power supply control means for controlling said main power unit to supply power to said storage means in a normal operating state in which said main power unit operates, and for controlling said auxiliary power unit to supply power to said storage means in a backup operating state when said main power unit stops its operation;

monitoring means for monitoring a mounting state of the cartridge in the backup operating state in which said main power unit stops operating and said auxiliary power unit supplies power to said storage means, and for generating information concerning the mounting state of the cartridge; and central control means for receiving the information concerning the mounting state of the cartridge and for controlling said recording means in accordance with the received information and an operating state, wherein, when said backup state converts to said normal operating state, said monitoring means outputs the information concerning the mounting state of said cartridge at the state conversion to said central control means, and said central control means controls execution of an initialization operation for said cartridge in said recording means according to the information concerning the mounting state of said cartridge.

10. A terminal apparatus having at least one section, comprising:

a main power unit for supplying power to the at least one section of said apparatus;

an auxiliary power unit for supplying power to the at least one section of said apparatus;

storage means for storing information with the use of power supplied by at least one of said main power unit and said auxiliary power unit;

recording means provided with a detachable cartridge;

power supply control means for controlling said main power unit to supply power to said storage means in a normal operating state in which said main power unit operates, and for controlling said auxiliary power unit to supply power to said storage means in a backup operating state when said main power unit stops its operation;

monitoring means for monitoring a mounting state of the cartridge in the backup operating state in which said main power unit stops operating and said auxiliary power unit supplies power to said storage means, and for generating information concerning the mounting state of the cartridge; and central control means for receiving the information concerning the mounting state of the cartridge and for controlling said recording means in accordance with the received information and an operating state, wherein, when said backup state converts to said normal operating state, said monitoring means outputs the information concerning whether said cartridge was changed during said backup state to said central control means, and said central control means controls execution of an initialization operation for said cartridge in said recording means according to the information concerning whether said cartridge was changed during said backup state.

11. A terminal apparatus having at least one section, comprising:

a main power unit for supplying power to the at least one section of said apparatus;

an auxiliary power unit for supplying power to the at least one section of said apparatus;

storage means for storing information with the use of power supplied by at least one of said main power unit and said auxiliary power unit;

recording means provided with a detachable cartridge;

power supply control means for controlling said main power unit to supply power to said storage means in a normal operating state in which said main power unit operates, and for controlling said auxiliary power unit to supply power to said storage means in a backup operating state when said main power unit stops its operation;

monitoring means for monitoring a mounting state of the cartridge in the backup operating state in which said main power unit stops operating and said auxiliary power unit supplies power to said storage means, and for generating information concerning the mounting state of the cartridge; and central control means for receiving the information concerning the mounting state of the cartridge and for controlling said recording means in accordance with the received information and an operating state, wherein, when said backup state converts to said normal operating state, said monitoring means outputs the information concerning the mounting state of said cartridge at the state conversion and the information concerning whether said cartridge was changed during said backup state to said central control means, and said central control means controls execution of an initialization operation for said cartridge in said recording means according to the information concerning the mounting state of said cartridge and the information concerning whether said cartridge was changed during said backup state.

12. A terminal apparatus having at least one section, comprising:

a main power unit for supplying power to the at least one section of said apparatus;

an auxiliary power unit for supplying power to the at least one section of said apparatus;

storage means for storing information with the use of power supplied by at least one of said main power unit and said auxiliary power unit;

recording means provided with a detachable cartridge;

power supply control means for controlling said main power unit to supply power to said storage means in a normal operating state in which said main power unit operates, and for controlling said auxiliary power unit to supply power to said storage means in a backup operating state when said main power unit stops its operation;

monitoring means for monitoring a mounting state of the cartridge in the backup operating state in which said main power unit stops operating and said auxiliary power unit supplies power to said storage means, and for generating information concerning the mounting state of the cartridge; and central control means for receiving the information concerning the mounting state of the cartridge and for controlling said recording means in accordance with the received information and an operating state, wherein, during said backup state, said monitoring means specifies a cartridge monitoring period during which said cartridge is monitored to determine whether it was changed and a cartridge monitoring stop period during which said cartridge is not monitored to determine whether it was changed.

13. A terminal apparatus according to claim 12, wherein said cartridge monitoring stop period is longer than said cartridge monitoring period.

14. A terminal apparatus having at least one section, comprising:

a main power unit for supplying power to the at least one section of said apparatus;

an auxiliary power unit for supplying power to the at least one section of said apparatus;

storage means for storing information with the use of power supplied by at least one of said main power unit and said auxiliary power unit;

recording means provided with a detachable cartridge;

power supply control means for controlling said main power unit to supply power to said storage means in a normal operating state in which said main power unit operates, and for controlling said auxiliary power unit to supply power to said storage means in a backup operating state when said main power unit stops its operation;

monitoring means for monitoring a mounting state of the cartridge in the backup operating state in which said main power unit stops operating and said auxiliary power unit supplies power to said storage means, and for generating information concerning the mounting state of the cartridge; and central control means for receiving the information concerning the mounting state of the cartridge and for controlling said recording means in accordance with the received information and an operating state, wherein said recording means comprises an ink-jet recording unit and, when said backup state converts to said normal operating state, said monitoring means outputs the information concerning the mounting state of said cartridge at the state conversion to said central control means, and said central control means controls execution of a head recovery operation for said cartridge in said recording means according to the information concerning the mounting state of said cartridge at said state conversion.

15. A terminal apparatus having at least one section, comprising:

a main power unit for supplying power to the at least one section of said apparatus;

an auxiliary power unit for supplying power to the at least one section of said apparatus;

storage means for storing information with the use of power supplied by at least one of said main power unit and said auxiliary power unit;

recording means provided with a detachable cartridge;

power supply control means for controlling said main power unit to supply power to said storage means in a normal operating state in which said main power unit operates and for controlling said auxiliary power unit to supply power to said storage means in a backup operating state when said main power unit stops its operation;

monitoring means for monitoring a mounting state of the cartridge in the backup operating state in which said main power unit stops operating and said auxiliary power unit supplies power to said storage means, and for generating information concerning the mounting state of the cartridge; and central control means for receiving the information concerning the mounting state of the cartridge and for controlling said recording means in accordance with the received information and an operating state, wherein said recording means comprises an ink-let recording unit and, when said backup state converts to said normal operating state, said monitoring means outputs the information concerning whether said cartridge was changed during said backup state to said central control means, and said central control means controls execution of a head recovery operation for said cartridge in said recording means according to the information concerning whether said cartridge was changed during said backup state.

16. A terminal apparatus having at least one section, comprising:

a main power unit for supplying power to the at least one section of said apparatus;

an auxiliary power unit for supplying power to the at least one section of said apparatus;

storage means for storing information with the use of power supplied by at least one of said main power unit and said auxiliary power unit;

recording means provided with a detachable cartridge;

power supply control means for controlling said main power unit to supply power to said storage means in a normal operating state in which said main power unit operates, and for controlling said auxiliary power unit to supply power to said storage means in a backup operating state when said main power unit stops its operation;

monitoring means for monitoring a mounting state of the cartridge in the backup operating state in which said main power unit stops operating and said auxiliary power unit supplies power to said storage means, and for generating information concerning the mounting state of the cartridge; and central control means for receiving the information concerning the mounting state of the cartridge and for controlling said recording means in accordance with the received information and an operating state, wherein said recording means comprises an ink-jet recording unit and, when said backup state converts to said normal operating state, said monitoring means outputs the information concerning the mounting state of said cartridge at the state conversion and the information concerning whether said cartridge was changed during said backup state to said central control means, and said central control means controls execution of a head recovery operation for said cartridge in said recording means according to the information concerning the mounting state of said cartridge and the information concerning whether said cartridge was changed during said backup state.

17. A terminal apparatus according to claim 16, wherein, when the information concerning whether said cartridge was changed during said backup state indicates that said cartridge was changed, said central control means controls said recording means such that a head recovery operation is executed for said cartridge according to the information concerning the mounting state of said cartridge in a conversion from said backup state to said normal operating state.

18. A terminal apparatus according to claim 17, wherein, when the information concerning whether said cartridge was changed during said backup state indicates that said cartridge was changed, said central control means controls said recording means such that a head recovery operation is executed for said cartridge according to a recording operation direction to said recording means.

19. A terminal apparatus having at least one section, comprising:

a main power unit for supplying power to the at least one section of said apparatus;

an auxiliary power unit for supplying power to the at least one section of said apparatus;

storage means for storing information with the use of power supplied by at least one of said main power unit and said auxiliary power unit;

recording means provided with a detachable cartridge;

power supply control means for controlling said main power unit to supply power to said storage means in a normal operating state in which said main power unit operates, and for controlling said auxiliary power unit to supply power to said storage means in a backup operating state when said main power unit stops its operation;

monitoring means for monitoring a mounting state of the cartridge in the backup operating state in which said main power unit stops operating and said auxiliary power unit supplies power to said storage means, and for generating information concerning the mounting state of the cartridge; and central control means for receiving the information concerning the mounting state of the cartridge and for controlling said recording means in accordance with the received information and an operating state, wherein, when a state in which power supplied from said auxiliary power unit is lowered to the specified voltage or less converts to said normal operating state, said monitoring means outputs the information concerning the mounting state of said cartridge at the state conversion to said central control means.

20. A terminal apparatus having at least one section, comprising:

a main power unit for supplying power to the at least one section of said apparatus;

an auxiliary power unit for supplying power to the at least one section of said apparatus;

storage means for storing information with the use of power supplied by at least one of said main power unit and said auxiliary power unit;

recording means provided with a detachable cartridge;

power supply control means for controlling said main power unit to supply power to said storage means in a normal operating state in which said main power unit operates, and for controlling said auxiliary power unit to supply power to said storage means in a backup operating state when said main power unit stops its operation;

monitoring means for monitoring a mounting state of the cartridge in the backup operating state in which said main power unit stops operating and said auxiliary power unit supplies power to said storage means, and for generating information concerning the mounting state of the cartridge; and central control means for receiving the information concerning the mounting state of the cartridge and for controlling said recording means in accordance with the received information and an operating state, wherein, when a state in which the power supplied from said auxiliary power unit is lowered to the specified voltage or less converts to said normal operating state, said monitoring means outputs to said central control means the information indicating that said cartridge was changed as the information concerning the change indication of said cartridge before conversion to said normal operating state.

21. A terminal apparatus having at least one section, comprising:

a main power unit for supplying power to the at least one section of said apparatus;

an auxiliary power unit for supplying power to the at least one section of said apparatus;

storage means for storing information with the use of power supplied by at least one of said main power unit and said auxiliary power unit;

recording means provided with a detachable cartridge;

power supply control means for controlling said main power unit to supply power to said storage means in a normal operating state in which said main power unit operates, and for controlling said auxiliary power unit to supply power to said storage means in a backup operating state when said main power unit stops its operation;

monitoring means for monitoring a mounting state of the cartridge in the backup operating state in which said main power unit stops operating and said auxiliary power unit supplies power to said storage means, and for generating information concerning the mounting state of the cartridge; and central control means for receiving the information concerning the mounting state of the cartridge and for controlling said recording means in accordance with the received information and an operating state, wherein, when a state in which power supplied from said auxiliary power unit is lowered to the specified voltage or less converts to said normal operating state, said monitoring means outputs the information concerning the mounting state of said cartridge at the state conversion and the information indicating that said cartridge was changed as the information concerning the change indication of said cartridge before conversion to said normal operating state to said central control means.

22. A terminal apparatus having at least one section, comprising:

a main power unit for supplying power to the at least one section of said apparatus;

an auxiliary power unit for supplying power to the at least one section of said apparatus;

storage means for storing information with the use of power supplied by at least one of said main power unit and said auxiliary power unit;

recording means provided with a detachable cartridge;

power supply control means for controlling said main power unit to supply power to said storage means in a normal operating state in which said main power unit operates, and for controlling said auxiliary power unit to supply power to said storage means in a backup operating state when said main power unit stops its operation;

monitoring means for monitoring a mounting state of the cartridge in the backup operating state in which said main power unit stops operating and said auxiliary power unit supplies power to said storage means, and for generating information concerning the mounting state of the cartridge; and central control means for receiving the information concerning the mounting state of the cartridge and for controlling said recording means in accordance with the received information and an operating state, wherein said recording means comprises an ink-jet recording unit and, when a state in which power supplied from said auxiliary power unit is lowered to the specified voltage or less converts to said normal operating state, said monitoring means outputs the information concerning the mounting state of said cartridge at the state conversion to said central control means.

23. A terminal apparatus having at least one section, comprising:

a main power unit for supplying power to the at least one section of said apparatus;

an auxiliary power unit for supplying power to the at least one section of said apparatus;

storage means for storing information with the use of power supplied by at least one of said main power unit and said auxiliary power unit;

recording means provided with a detachable cartridge;

power supply control means for controlling said main power unit to supply power to said storage means in a normal operating state in which said main power unit operates, and for controlling said auxiliary power unit to supply power to said storage means in a backup operating state when said main power unit stops its operation;

monitoring means for monitoring a mounting state of the cartridge in the backup operating state in which said main power unit stops operating and said auxiliary power unit supplies power to said storage means, and for generating information concerning the mounting state of the cartridge; and central control means for receiving the information concerning the mounting state of the cartridge and for controlling said recording means in accordance with the received information and an operating state, wherein said recording means comprises an ink-jet recording unit and, when a state in which the power supplied from said auxiliary power unit is lowered to the specified voltage or less converts to said normal operating state, said monitoring means outputs to said central control means the information indicating that said cartridge was changed as the information concerning the change indication of said cartridge before conversion to said normal operating state.

24. A terminal apparatus having at least one section, comprising:

a main power unit for supplying power to the at least one section of said apparatus;

an auxiliary power unit for supplying power to the at least one section of said apparatus;

storage means for storing information with the use of power supplied by at least one of said main power unit and said auxiliary power unit;

recording means provided with a detachable cartridge;

power supply control means for controlling said main power unit to supply power to said storage means in a normal operating state in which said main power unit operates, and for controlling said auxiliary power unit to supply power to said storage means in a backup operating state when said main power unit stops its operation;

monitoring means for monitoring a mounting state of the cartridge in the backup operating state in which said main power unit stops operating and said auxiliary power unit supplies power to said storage means, and for generating information concerning the mounting state of the cartridge; and central control means for receiving the information concerning the mounting state of the cartridge and for controlling said recording means in accordance with the received information and an operating state, wherein said recording means comprises an ink-jet recording unit and, when a state in which power supplied from said auxiliary power unit is lowered to the specified voltage or less converts to said normal operating state, said monitoring means outputs the information concerning the mounting state of said cartridge at the state conversion and the information indicating that said cartridge was changed as the information concerning the change indication of said cartridge before conversion to said normal operating state to said central control means.

\* \* \* \* \*